Dec. 14, 1965　　　A. J. ROBERTSON　　　3,223,034
ROCKET FIN ASSEMBLY
Filed May 6, 1964　　　　　　　　　　　2 Sheets-Sheet 1
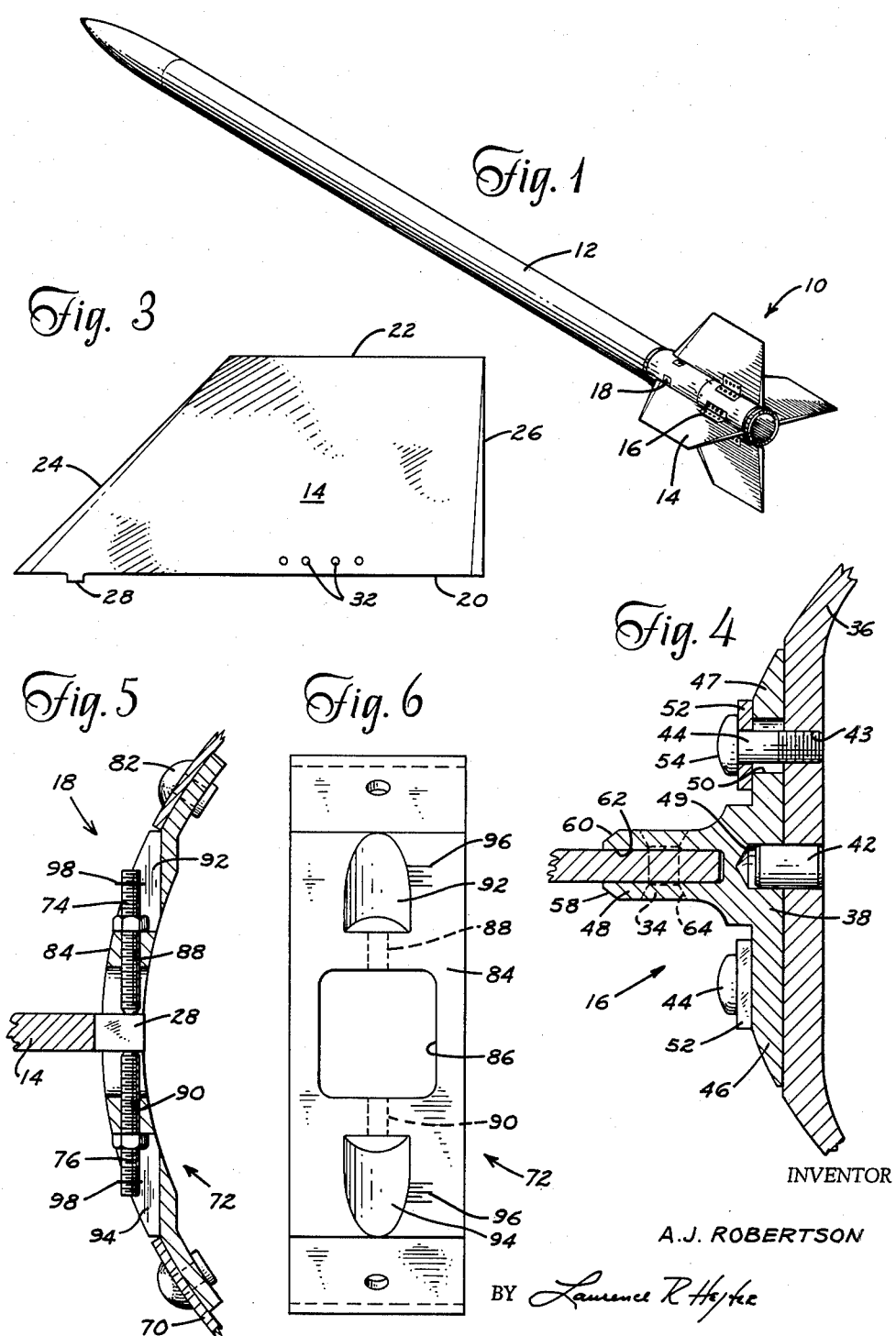
INVENTOR
A.J. ROBERTSON
BY Laurence R Heyler
ATTORNEY

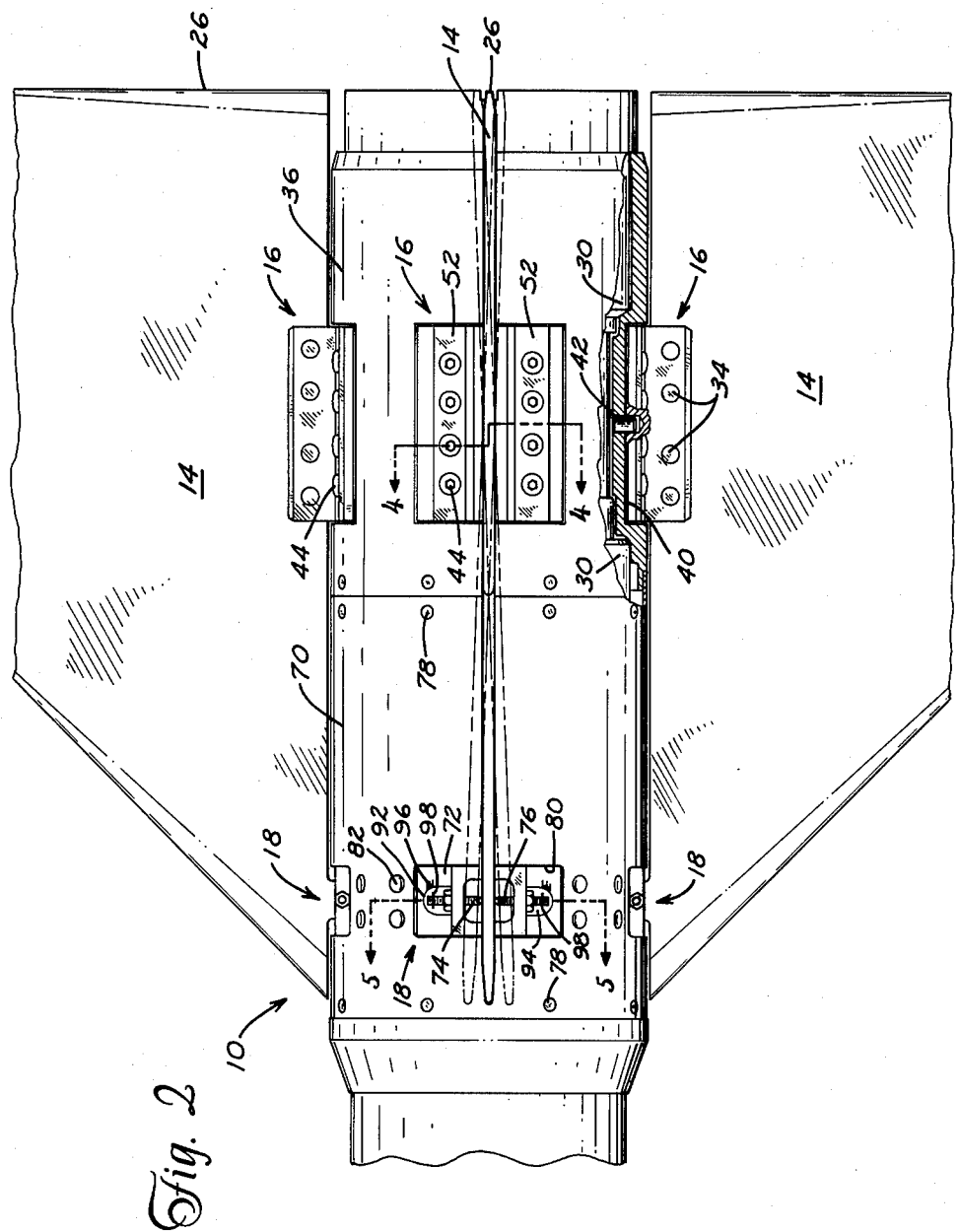

United States Patent Office 3,223,034
Patented Dec. 14, 1965

3,223,034
ROCKET FIN ASSEMBLY
Alvin J. Robertson, Glendora, Calif., assignor to Atlantic Research Corporation, Fairfax, Va., a corporation of Virginia
Filed May 6, 1964, Ser. No. 365,306
10 Claims. (Cl. 102—50)

This invention relates to a rocket fin assembly and, more particularly, to a fin assembly capable of prefight fin incidence adjustment.

Heretofore, it has been the customary practice in many types of rocket vehicles to unalterably affix fins to the vehicle body, such as by welding. Specifically, in the case of certain rocket vehicles or rocket booster units, the fins have been customarily formed by welding together the various components of each fin and then the fins are welded directly to the quadrant assembly structure constituting the casing of the rocket or booster body. This welding of the components introduces a source of possible undesirable distortion of the fin, such as fin twist, bow and the like, and eliminates the possibility of adjustment of fin incidence setting in the field. Furthermore, in those structures where it has been possible to adjust fin incidence, such adjustment requires extremely sensitive and accurate adjusting means, measuring instruments as well as special tools.

Accordingly, it is one object of this invention to provide a rocket fin assembly capable of accurate fin incidence adjustment with relatively insensitive adjusting means.

It is another object of this invention to provide a rocket fin assembly capable of on-location rapid fin incidence adjustment using standard tools.

Further objects and attendant advantages of the present invention will become better understood from the following description.

Briefly stated, this invention, in one form, provides an adjustable rocket fin assembly comprising a pair of spaced mounting means adapted for mounting on a rocket casing and a rocket fin received by both mounting means. One of the mounting means includes a shroud and a mounting bracket attached to the shroud to permit relative rotational motion therebetween. The mounting bracket includes a pair of web members spaced apart to fixedly receive a portion of the rocket fin.

The other mounting means includes a recess to receive a projection extending from the base of the fin. A pair of threaded adjusting screws cooperates with the latter mounting means; the screws being mounted thereon adjacent each side of the projection so that rotation of the adjusting screws in opposite direction causes the screws to translate in the same direction, and because of their contiguous relationship to the fin projection, causes the fin to rotate about the first-mentioned mounting means. Locking means are provided to fix the fin in its realigned position upon attainment of the desired incidence readjustment.

While the specification concludes with claims particularly pointing out and distinctly claiming the subject matter which is regarded as the invention, it is believed that the invention will become better understood from the following description taken in combination with the accompanying drawings in which corresponding elements are referred to by the same numerals.

FIGURE 1 is a perspective view of a rocket employing a rocket fin assembly formed in accordance with this invention.

FIGURE 2 is a plan and partial sectional view of a rocket fin assembly formed in accordance with this invention mounted on a rocket casing.

FIGURE 3 is an elevational view of a rocket fin employed in the assembly of this invention.

FIGURE 4 is a sectional view taken along lines 4—4 of FIGURE 2 and illustrating a first mounting means.

FIGURE 5 is a sectional view taken along lines 5—5 of FIGURE 2 and illustrating a second mounting means.

FIGURE 6 is a plan view of the second mounting means of FIGURE 5.

With reference to the drawings, and more particularly FIGURE 1, there is illustrated a plurality of rocket fin assemblies, indicated generally by the reference character 10, formed with this invention, mounted on the aft or tail end of a rocket 12. It is to be understood that the fin assembly 10 of the present invention may be used with a wide variety of rocket vehicles or booster stages for rocket vehicles and, furthermore, that the present invention concerns the rocket fin assembly per se rather than the combination of the fin assembly mounted on the rocket casing.

Each fin assembly 10 includes a fin 14, a first mounting means 16, and a second mounting means 18 all of which can be seen in their assembled positions in FIGURE 2. The fin 14, illustrated in detail in FIGURE 3, may have any desired shape but is illustrated as having the conventional trapezoidal profile including a base or root 20, a tip 22 of considerably shorter axial dimension than the base 20 and spaced outwardly therefrom, a leading edge 24 inclined with respect to the base and a trailing edge 26 normal to the base. A projection 28 extends outwardly from the base 20 and lies in a plane passing through the base 20 and the tip 22. The projection 28 may be located near the trailing edge 26 but is preferably located near the leading edge 24 as shown in FIGURE 3. The preference for locating the projection 28 near the leading edge will be appreciated upon consideration of the assembled fin on the rocket casing 30 as shown in FIGURE 2 where it may be seen that the fin trailing edge 26 projects axially beyond the aft end of the casing 30. A plurality of holes 32 through which are passed fastening means such as bolts or rivets 34 are located adjacent the fin base 20 and spaced axially from the fin projection 28.

The first mounting means, illustrated in section in FIGURE 4, includes a shroud 36 and a mounting bracket 38, the former being adapted to be mounted on the rocket casing 30 and the latter being adapted to receive the base 20 of the rocket fin 14. An indentation flat, or recess 40 is provided the outer surface of the shroud 36 to receive the mounting brackets 38. The shroud 36 has a stepped cross section, as illustrated in FIGURE 2, in order to maintain strength in the area of the recess 40 and to conform to the stepped outer surface of the casing 30. The stepped casing surface is conventional for aft ends of rocket motors because it is here where the diverging portion of thea exhaust nozzle meets with the converging and throat portions. The shroud 36 is slipped over the converging and throat portions of the exhaust nozzle and then the diverging portion of the nozzle is inserted within the shroud 36 and attached to the throat section such as by threaded means (not shown). Therefore, the stepped configuration also serves as a retention means for holding the shroud 36 in place. Additional means such as keying, welding, riveting, and the like, may be used to attach the shroud 36 to the casing 30.

A journal member or dowel 42 is fixedly attached to and extends radially from the shroud 36 at the center of indentation 40 and provides a pivot point about which the mounting bracket 38 can rotate. One such indentation or recess 40 is required for each fin 14 intended to be mounted on the rocket, for example, in the illustrated embodiment, four are employed. Two parallel rows of internally threaded bolt holes 43, one row on each side of the journal member 42, extend through the shroud 36 to receive bolts 44 for affixing the mounting bracket 38 on the shroud as described below.

The mounting bracket 38 has a general "T" configuration in cross section as may be seen in FIGURE 4 including flanged arms 46, 47 and a stem portion 48. The flanged arms 46, 47 fit within the recess 40 in the outer surface of the shroud 36 and include a cylindrical cavity 49 to receive the journal member or dowel 42 at the juncture of the flanged arms 46, 47. A plurality of bolt holes 50 is provided through each arm 46, 47, respectively, to coincide with the bolt holes 43 through the shroud 36. The bolt holes 50 have a diameter larger than that of the bolts 44 and the bolt holes 43 in order to provide sufficient clearance between the bolts 44 and the sides of the bolt holes 50 to accommodate motion of the mounting bracket 38 with respect to the shroud 36. To serve as a locking means for clamping the mounting bracket 38 on the shroud 36 there are provided two elongated plates or straps 52 extending across the rows of bolt holes 50 through each arm 46, 47 and bolts 44, each having an enlarged head 54. Upon tightening the bolts 44 the straps 52 will press against the surface of the arms 46, 47 and effect clamping of the mounting bracket 38 to the shroud 36 and thus restrain the mounting bracket from relative movement.

The stem portion 48 of the mounting bracket 38 comprises a pair of spaced web members 58 and 60 which form a groove 62 of sufficient width to receive the base 20 of the fin 14. Bolt or rivet holes 64 are provided transversely through the web members 58 and 60 and are located so as to coincide with the holes 32 provided through the fin 14. Appropriate fastening means, such as rivets 34, are passed therethrough to fixedly attach the fin 14 in the mounting bracket 38.

The combination of the rigid mounting between the fin 14 and the mounting bracket 38 and the removable attachment between the mounting bracket 38 and the shroud 36 permits rotation of the fin 14 with respect to the shroud 36 about the journal member 42 when the bolts 44 are loosened. The application of torque to the fin 14 will cause rotation of the fin about the shroud 36 and, since the shroud 36 is fixedly attached to the rocket casing 30, relative rotation will take place between the fin 14 and the rocket casing 30.

The second mounting means 18, more clearly shown in FIGURES 5 and 6, includes a shroud or tubular member 70, an adjusting bracket 72, and a pair of adjusting means or screws 74, 76. The tubular member 70 forms an enclosure about the aft portion of the rocket motor which is upstream from the shroud 36 which encloses the throat and diverging portion of the exhaust nozzle. The tubular member 70 may be attached to the rocket casing 30 by any appropriate means, such as through threaded attaching means or rivets 78 or by welding or by a combination thereof. The tubular member 70 has a plurality of rectangular openings 80 provided therethrough to receive the adjusting brackets 72. The number of openings 80 corresponds to the number of fins 14 intended to be attached to the rocket, for example, in the particular embodiment under discussion there are four fins applied to the rocket and, therefore, there are four circumferentially and equally spaced openings 80 provided through the tubular member 70.

Within each of the openings 80 is placed an adjusting bracket 72 which is fixedly attached to the tubular member 70 through appropriate means such as rivets 82. The adjusting bracket 72 includes a raised portion 84, extending outwardly therefrom and a recess 86 located centrally within the raised portion 84 to receive the fin projection 28. The circumferential width of the recess 86 corresponds to the range through which it is desired to permit adjustment of the fin incidence as may be seen in FIGURE 2 where the solid lines indicate the central position of the fin 14 and the phantom lines indicate the extremes of the angular adjustment. A pair of internally threaded bores 88, 90 extends through raised portion 84, one bore being on each side of the recess 86 with the axis of the bores being aligned with respect to one another and with respect to the projection 28 and being transverse to the longitudinal axis of the fin 14. Adjusting means comprising threaded adjusting screws 74, 76 is threadedly received within each of the bores 88, 90, respectively, such that one end of each of the adjusting screws 74, 76 abuts the fin projection 28 as is clearly shown in FIGURE 5. To permit easy access to the other end of the screws 74, 76 for purposes of rotating them there is provided concave indentations 92, 94 in the raised portion 84 contiguous to the ends of the bores 88, 90, respectively. Rotation of the screws 74, 76 in such a direction as to produce unidirectional translation of the screws applies a force to the fin projection 28 and thus effects a torque on the fin about the journal member 42.

To adjust the fin incidence the first mounting means, bolts 54 which pass through the mounting bracket 38 and the shroud 36 are loosened in order to permit rotation of the fin 14 about the journal member 42. The adjusting screws 74, 76 are then rotated in the appropriate direction to cause unidirectional translational movement thereof which causes the leading edge of the fin 14 to translate in a transverse direction and thus effects rotation of the fin 14 about the journal member 42. For example, to cause the fin 14 to rotate clockwise, one adjusting screw 74 is moved away from the fin 14 by being rotated in a counterclockwise direction while the other adjusting screw 76 forces the fin in the proper direction by being rotated in a clockwise direction. When the fin 14 has been properly aligned the first mounting means' bolts 54 are tightened in order to hold the fin in its realigned position.

It can be seen that by locating the adjusting bracket 72 spaced from the axis of rotation of the fin accurate adjustment of the fin incidence can be achieved without the use of sensitive and costly adjusting means. The adjusting screws 74, 76 provide micrometry means for adjusting the angle incidence but because of the distance between the axis of fin rotation, i.e., the journal member 42, and the adjusting bracket 72 the adjusting screw threads can be relatively coarse and still provide the desired degree of accuracy. The screws 74, 76 can be calibrated so as to give a direct indication of the degree of incidence of the fin 14. Such calibration, for example calibrating indicia 96, can be placed on the exposed surface of the adjusting bracket 72. An indicator 98 is located on each adjusting screw 74, 76 for purposes of indicating the exact orientation of the fin 14 relative to a predetermined reference line. It is clear that adjustment of the fin incidence can be achieved with conventional tools since all that the need be done is to loosen the first mounting means' bolts 54 and rotate the adjusting screws 74, 76. It is also obvious that replacement of the fin 14 can be easily accomplished by simply removing the rivets 34 which hold the fin 14 to the mounting bracket 38 and inserting a new fin 14.

While one specific embodiment has been shown, it should be clear to those skilled in the art that various modifications and alterations can be made without departing from the basic concept of this invention. Accordingly, it is intended that the claims appended hereto include all such modifications as fall within the true spirit and scope of this invention. What is claimed as new and endeavored to be secured by Letters Patent of the United States is:

1. An adjustable rocket fin assembly comprising
    (a) a fin having a leading edge, a trailing edge, a tip, and a base, said tip and base being spaced apart and extending between said leading edge and said trailing edge, said fin including a projection extending from said base,
    (b) first mounting means attached to said base at a position displaced from said projection to permit relative rotational movement between said fin and said first mounting means about an axis through said base and said tip, said first mounting means being adapted for mounting on a rocket casing,
    (c) second mounting means adapted to be mounted on said casing, said second mounting means including a recess for adjustably receiving said projection, and
    (d) adjusting means mounted on said second mounting means and cooperating with said projection to effect limited transverse movement of said projection within said recess and to effect limited rotational movement of said fin relative to said first mounting means.

2. An adjustable rocket fin assembly as defined in claim 1 wherein
    (a) said second mounting means includes a raised portion, said raised portion having said recess therein and a pair of internally threaded bores extending through said raised portion, said bores being located on opposite sides of said recess, the axis of each of said bores being transverse to the longitudinal axis of said fin and being aligned with said projection, and
    (b) said adjusting means comprises a pair of threaded adjusting screws, one of said screws being received within and mating with each of said bores, one end of each of said screws abutting said projection such that rotation of each of said screws relative to said bores producing unidirectional translation of said screws effects rotational movement of said fin relative to said casing.

3. An adjustable rocket fin assembly as defined in claim 2 wherein said adjusting means includes indicia indicating the orientation of said fin relative to an axis passing longitudinally through the center of said first and said second mounting means.

4. An adjustable rocket fin assembly as defined in claim 2 wherein said first mounting means includes
    (a) a pair of spaced web members for receiving said base, and
    (b) means for fixedly attaching said base to said web members.

5. An adjustable rocket fin assembly as defined in claim 4 wherein said first mounting means includes
    (a) a shroud adapted for mounting on a rocket casing, said shroud having a journal member extending therefrom,
    (b) a mounting bracket removably attached to said shroud, said bracket having a cavity in the bottom thereof for receiving said journal member, said journal member and said cavity being sized to permit rotation of said bracket on said journal member, and
    (c) locking means for fixedly holding said bracket on said shroud.

6. An adjustable rocket fin assembly as defined in claim 5 wherein
    (a) said first mounting means includes an indentation provided in said shroud to receive said mounting bracket, and
    (b) said journal member extends radially outwardly from the center of said indentation.

7. An adjustable rocket fin assembly as defined in claim 5 wherein
    (a) said shroud includes a plurality of internally threaded first bolt holes,
    (b) said mounting bracket includes a plurality of corresponding second bolt holes extending therethrough, said second bolt holes having a diameter larger than said first bolt holes, and
    (c) said locking means includes a plurality of externally threaded bolts having enlarged heads, said bolts threadedly engaging said first bolt holes and said heads having a diameter larger than the diameter of said second bolt holes.

8. An adjustable rocket fin assembly as defined in claim 7 wherein said locking means includes a strap extending across said second bolt holes, said strap having a plurality of third bolt holes aligned with said first and second bolt holes to receive said bolts, said third bolt holes having a diameter smaller than the diameter of said bolt heads.

9. An adjustable rocket fin assembly comprising
    (a) a fin having a leading edge, a trailing edge, a tip and a base, said tip and base being spaced apart and extending between said leading edge and said trailing edge, said fin including a projection extending from said base and lying in a plane passing through said base and said tip,
    (b) first mounting means including
        (1) a shroud adapted for mounting on a rocket casing, said shroud having at least two rows of internally threaded first bolt holes and a cylindrical journal member extending radially outwardly from said shroud, said journal member being located between said rows of first bolt holes,
        (2) a mounting bracket removably attached to said shroud said bracket having
            (aa) a cylindrical cavity in the bottom thereof for receiving said journal member, said journal member and said cavity being sized to permit rotation of said bracket on said journal member,
            (bb) at least two rows of second bolt holes extending therethrough, said second bolt holes being aligned with said first bolt holes and having a diameter greater than said first bolt holes,
            (cc) a pair of spaced web members for receiving said base at a position on said base displaced from said projection.
        (3) locking means for fixedly attaching said bracket to said shroud to prevent relative rotational motion between said fin and said shroud, said locking means including a strap extending across each of said rows of second bolt holes, said strap having a plurality of third bolt holes aligned with said second and said first bolt holes, and a plurality of externally threaded bolts having enlarged heads, said bolts passing through said third bolt holes, said second bolt holes and threadedly engaging said first bolt holes, said bolt heads having a diameter larger than the diameter of said second and third bolt holes, and
    (c) second mounting means adapted to be mounted on said casing, said second means including
        (1) a raised portion having a recess therein for adjustably receiving said projection, and a pair of internally threaded bores extending through said raised portion, said bores being located on opposite sides of said recess, the axis of each of said bores being transverse to the longitudinal axis of said fin and being aligned with said projection, and (d) adjusting means mounted on said second mounting means, said adjusting means comprising a pair of externally threaded adjusting screws, one of said screws being received within and mating with each of said bores, one end of each of said screws abutting said projection such that rotation of each of said screws relative to said bores producing unidirectional translation of said screws effects rotational movement of said fin relative to said casing.

10. An adjustable rocket fin assembly as defined in claim 9 wherein said projection is located adjacent said leading edge.

References Cited by the Examiner

UNITED STATES PATENTS 3,135,203  6/1964  Halsted et al. _____ 102—50

FOREIGN PATENTS 1,257,601  2/1961  France.

BENJAMIN A. BORCHELT, *Primary Examiner.*

V. R. PENDEGRASS, *Assistant Examiner.*